US010830576B2

(12) United States Patent
Gonzaga et al.

(10) Patent No.: US 10,830,576 B2
(45) Date of Patent: Nov. 10, 2020

(54) UNIT FOR DETECTING GEOMETRIC CHARACTERISTICS OF A COMPONENT OF A TIRED WHEEL OF A VEHICLE

(71) Applicant: Butler Engineering and Marketing S.p.A., Rolo (IT)

(72) Inventors: Tullio Gonzaga, Correggio (IT); Cristiano Tarozzi, Rio Saliceto (IT)

(73) Assignee: BUTLER ENGINEERING AND MARKETING S.P.A., Rolo (IT)

( * ) Notice: Subject to any disclaimer, the term of this patent is extended or adjusted under 35 U.S.C. 154(b) by 53 days.

(21) Appl. No.: 16/199,716

(22) Filed: Nov. 26, 2018

(65) Prior Publication Data

US 2019/0178632 A1 Jun. 13, 2019

(30) Foreign Application Priority Data

Dec. 11, 2017 (IT) .................. 102017000142192

(51) Int. Cl.
*G01B 11/22* (2006.01)
*G01B 11/24* (2006.01)
*G01M 17/02* (2006.01)
*G01M 17/013* (2006.01)

(52) U.S. Cl.
CPC .............. *G01B 11/22* (2013.01); *G01B 11/24* (2013.01); *G01M 17/027* (2013.01); *G01M 17/013* (2013.01); *G01M 17/02* (2013.01)

(58) Field of Classification Search
CPC .............. G06T 7/60; G06T 2207/30252; G06T 2207/10048; G06T 2207/10012; H04N 13/239; H04N 13/254; G01M 17/027; G01M 17/013; G01M 17/02; G01B 11/24; G01B 11/22
See application file for complete search history.

(56) References Cited

U.S. PATENT DOCUMENTS

| 5,485,406 | A | * | 1/1996 | Wada | G01B 11/22 33/551 |
| 5,987,978 | A | * | 11/1999 | Whitehead | G01B 11/22 73/146 |
| 6,069,966 | A | * | 5/2000 | Jones | G01B 11/22 382/100 |
| 6,269,688 | B1 | * | 8/2001 | Kroll | G01M 17/02 73/146 |
| 6,347,550 | B1 | * | 2/2002 | Kroening | B61K 9/12 73/598 |
| 6,789,416 | B1 | * | 9/2004 | Tracy | G01B 11/22 73/146 |

(Continued)

FOREIGN PATENT DOCUMENTS

DE 202014007378 9/2014

OTHER PUBLICATIONS

Search Report for IT 102017000142192 dated Apr. 30, 2018 (7 pages).

*Primary Examiner* — Sang H Nguyen

(74) *Attorney, Agent, or Firm* — Tutunjian & Bitetto, P.C.

(57) ABSTRACT

The present invention regards a unit for detecting geometric characteristics of a component (T, W) of a tired wheel (TW) of a vehicle (V), including a housing box or casing, at least one lighting means, at least one sensor means, at least one screen component or protection glass for the lighting means and/or for the sensor means and at least one means for delivering a cleaning fluid above the protection screen component.

13 Claims, 4 Drawing Sheets

(56) References Cited

U.S. PATENT DOCUMENTS

| | | | |
|---|---|---|---|
| 7,797,995 B2* | 9/2010 | Schafer | B60C 11/24 |
| | | | 73/146 |
| 9,046,446 B1* | 6/2015 | Carroll | G01M 17/027 |
| 2003/0209061 A1* | 11/2003 | Schoeninger | G01M 17/022 |
| | | | 73/117.01 |
| 2011/0100108 A1* | 5/2011 | Tracy | G01M 17/02 |
| | | | 73/146 |
| 2017/0301103 A1* | 10/2017 | Gonzaga | H04N 13/254 |
| 2017/0349007 A1 | 12/2017 | Wei | |

* cited by examiner

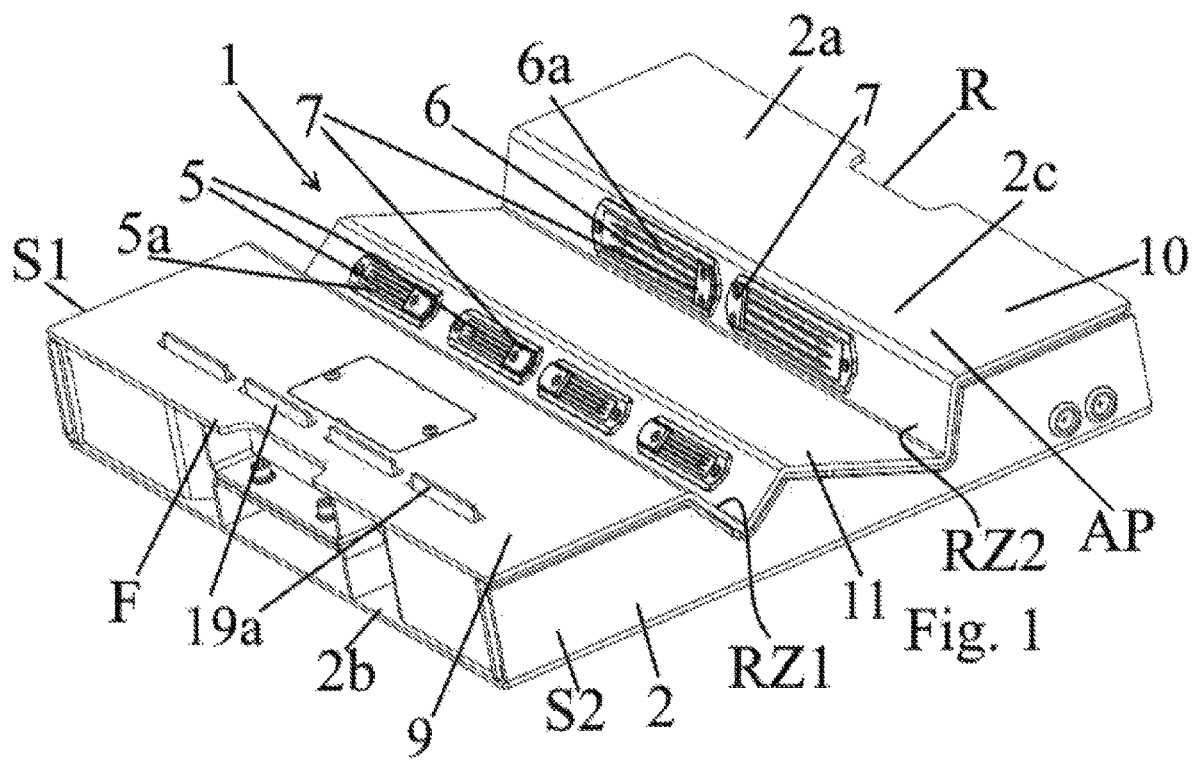
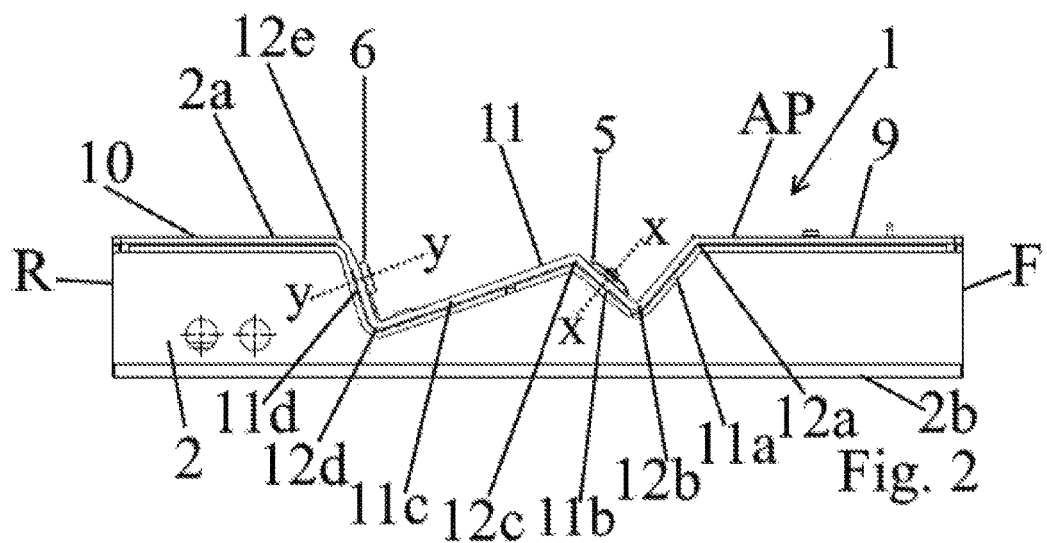

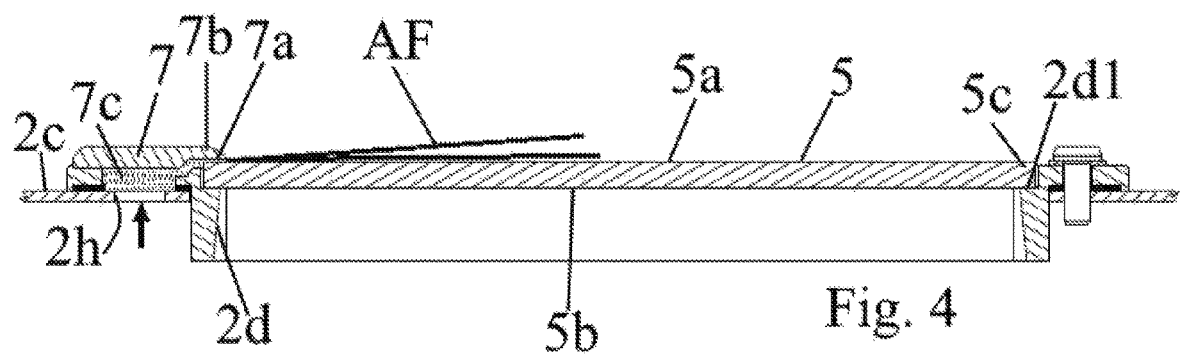
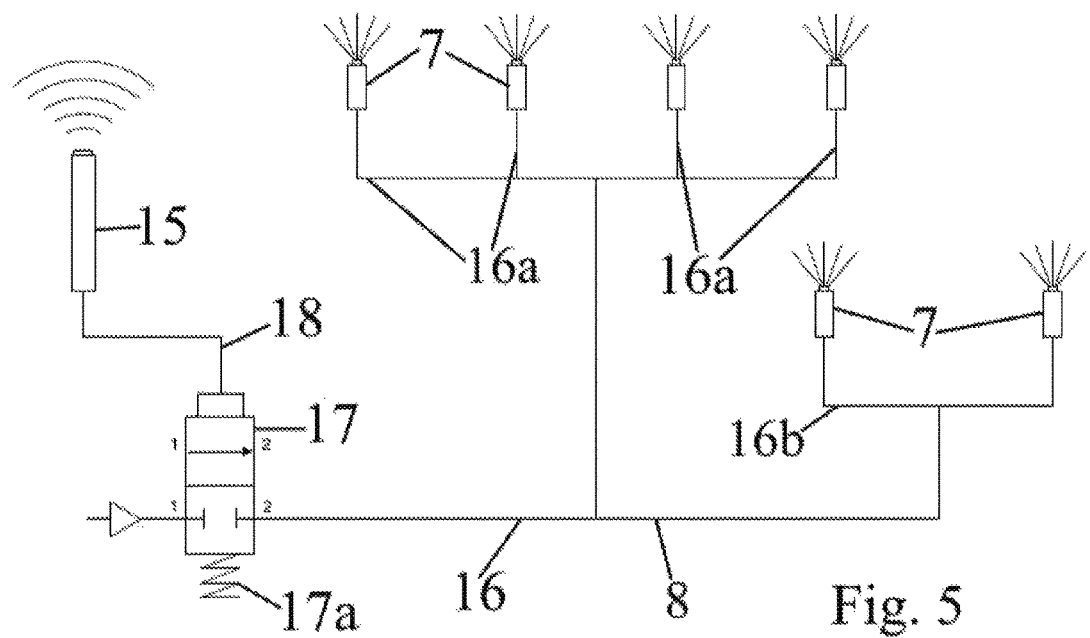

UNIT FOR DETECTING GEOMETRIC CHARACTERISTICS OF A COMPONENT OF A TIRED WHEEL OF A VEHICLE

TECHNICAL FIELD OF THE INVENTION

The present invention regards a unit for detecting geometric characteristics of a component of a tired wheel of a vehicle.

RELATED ART

Various solutions have been proposed for measuring the geometry of rims or of tires of a tired wheel, for example the wear or the profile of the tire tread, including some proposals that come into contact with a component of a wheel and others which operate without contact.

The proposed contactless solutions are mainly obtained with one or more triangulation systems which use lasers in the visible light field, both point-like and blade-like systems, as well as a camera. In the case of point-like triangulators, the measuring heads are movable and operate as a laser scanner.

The U.S. Pat. No. 9,046,446B1 teaches a platform defining an advancing path for a wheel of a tire, having illuminating laser as well as cameras housed within the platform itself. The platform then delimits some openings set to allow the passage of the laser light and images towards the cameras.

In addition, a system for cleaning protection glasses of the cameras and lasers is also provided for, e.g. an air system.

With one such solution, the dust or dirt removed from the glasses is scattered along the platform, which requires a periodic cleaning of the latter.

In addition, the cameras and the lasers are mounted in a position distant from the zone of the tire to be inspected and attention must be given to the arrangement of such components for the alignment of the respective action fields with openings in the platform.

US2011100108A1 and DE202014007378U1 teach respective solutions according to the state of the art.

SUMMARY OF THE INVENTION

One object of the present invention is to provide a new unit for detecting geometric characteristics of a component of a tired wheel of a vehicle.

Another object of the present invention is to provide a unit as stated above which is able to carry out the cleaning of protection screens of components of the unit in a quick and effective manner.

Another object of the present invention is to provide a unit as indicated above which can be inspected and, if necessary, which can be cleaned in a simple and quick manner.

In accordance with one aspect of the invention, a unit according to an aspect of the present invention is provided.

The present application refers to preferred and advantageous embodiments of the invention.

BRIEF DESCRIPTION OF THE DRAWINGS

Other characteristics and advantages of the invention will be more evident from the description of an embodiment of a unit, illustrated by way of example in the enclosed drawings, in which:

FIG. 1 is a perspective view of a unit according to the present invention with indication of the flows of a cleaning fluid;

FIG. 2 is a side view of the unit of FIG. 1;

FIG. 4 is a sectional view of a detail of the unit of FIG. 1 at a respective protection screen or glass component with indication of the flows of a cleaning fluid;

FIG. 5 illustrates a pneumatic diagram of a unit according to the present invention.

In the enclosed drawings, equivalent parts or components are marked by the same reference numbers.

DETAILED DESCRIPTION OF THE INVENTION

Figure 3:
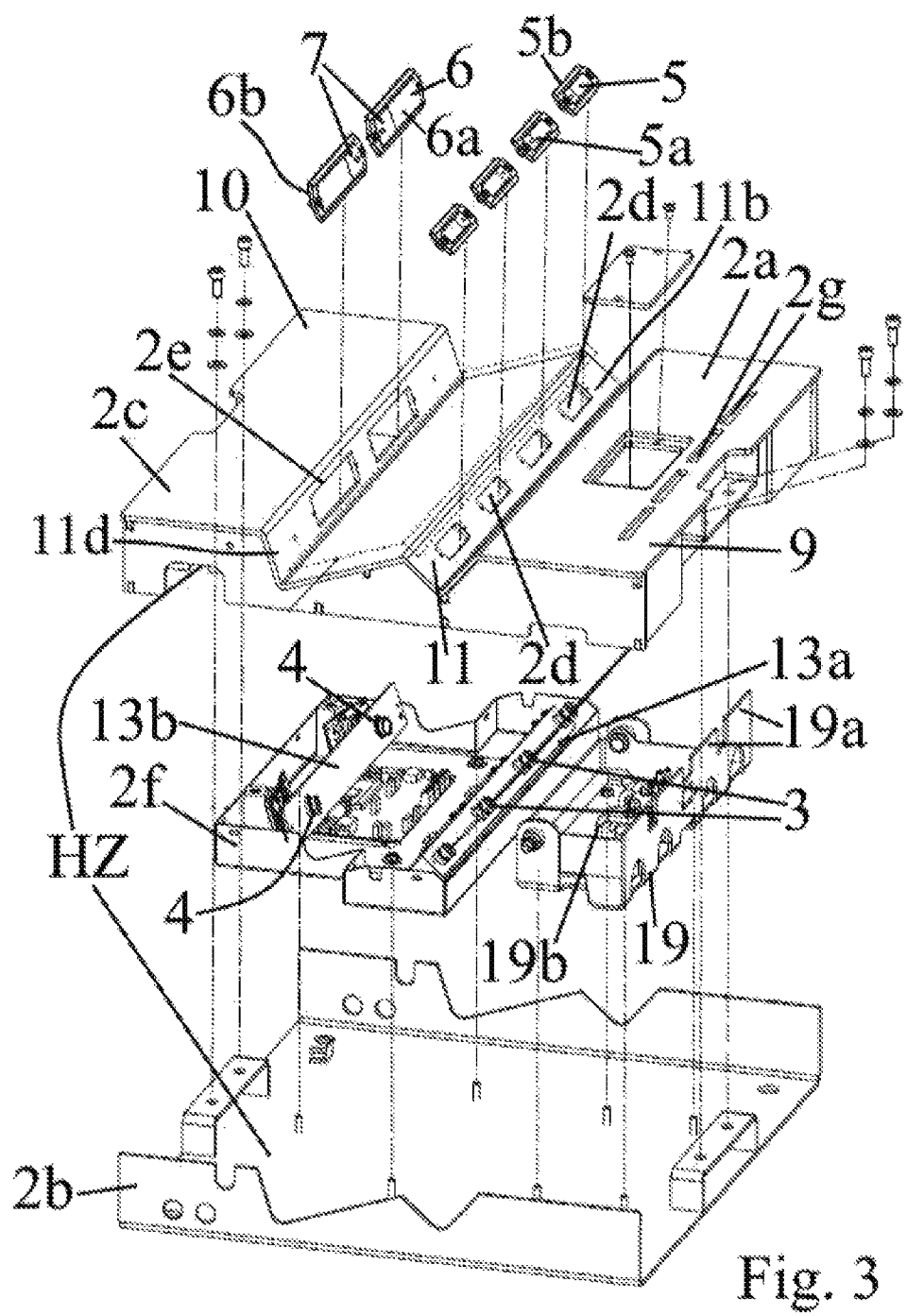
FIG. 3 is an exploded view of the unit of FIG. 1.

First with reference to FIGS. 1 to 5, a unit 1 is illustrated for detecting geometric characteristics of a component, such as the tire T or the rim W of a tired wheel TW of a vehicle V, and such unit 1 comprises a housing box or casing 2 internally defining at least one housing zone HZ and externally defining an advancing path section or area AP of a tired wheel TW.

The unit 1 is then provided with at least one lighting means 3, such as a laser, e.g. four, set to illuminate a portion of a component T, W of a tired wheel TW, and with at least one sensor means 4, such as a camera, e.g. two, set to detect geometric characteristics of a component T, W of a tired wheel TW of a vehicle V illuminated by means of the lighting means 3.

The lighting means 3 and/or the sensor means 4 are housed in the housing zone HZ.

For such purpose, the casing 2 can comprise two half-shells or multiple shells 2a, 2b that can be coupled or constrained to each other, if desired by means of screws, bolts or similar means, so as to define the housing zone HZ.

Both the at least one lighting means 3 and the at least one sensor means 4 are directed or better yet arranged with the respective illumination or detection axis x-x, y-y (see in particular FIG. 2) in the same sense or better yet towards the front F or the entrance of a wheel TW in the unit 1 or towards the rear R or exit of a wheel TW from the unit 1. In substance, such expedient is provided to ensure that the lighting means 3 illuminates a zone of a tire that must be detected or acquired by a sensor means 4.

The following are then provided in the unit 1: at least one protection screen or glass component 5, 6 for the lighting means 3 and/or for the sensor means 4 along with at least one means 7 for delivering a cleaning fluid above the protection screen component 5, 6. The unit 1 is then provided with means 8 for activating the delivery means 7.

More particularly, a respective delivery means 7 is provided for each lighting means 3 along with a respective delivery means 7 for each sensor means 4.

A protection screen or glass component 5 can also be provided for each lighting means 3 along with a protection screen or glass component 6 for each sensor means 4.

Clearly, a protection screen or glass component can be provided that is common for all the light means 3 and/or for all the sensor means 4, along with a delivery means common for such components set to operate on a common screen component or separate screen components.

In addition, the protection screen component 5, 6 is mounted at a wall, upper during use, or in any case external during use 2c of the housing box or casing 2 defining on one side the housing zone HZ with other walls of the casing 2 and on the other side an advancing path section or area AP of a tired wheel TW, such that the protection screen component 5, 6 leads to or emerges outside the casing 2, while the means 7 for delivering a cleaning fluid are set to operate on the exterior of the casing 2 at the external surface 5a, 6a of the protection screen component 5, 6.

If desired, the protection screen component 5, 6 is mounted at one or respective windows 2d, 2e, e.g. through windows, delimited by the wall, upper during use 2c.

The at least one lighting means 3 and/or the at least one sensor means 4 can instead be mounted close to or in contact with the internal surface 5b, 6b of the or of a protection screen component 5, 6 or in any case they can be mounted proximal to such internal surface 5b, 6b.

More particularly, the wall, upper during use 2c, of the casing 2 or of a semi-shell 2a thereof can delimit at least one or more recessed zones RZ1, RZ2, and the protection screen component 5, 6 can lead to or emerge at a respective recessed zone RZ1, RZ2.

Still more particularly, the wall, upper during use 2c, can have a first inlet section or portion 9 in the advancing path section or area AP, e.g. flat and horizontal, a second outlet section or portion 10 from the advancing path section or area AP, e.g. flat and horizontal, and an intermediate section or portion 11 of bridge connection between the first inlet section or portion 9 and the second outlet section or portion 10; the intermediate section or portion 11 includes two or more successive segments 11a-11d that are tilted with respect to the adjacent segments and if desired with respect to the horizontal, so as to define a recessed zone RZ1, RZ2. In such case, the or each protection screen component 5, 6 is extended in or along one of the tilted segments 11a, 11c, e.g. with trim tilted with respect to the horizontal and in a direction from one side S1 to the other S2 of the unit.

The recessed zones RZ1, RZ2 are preferably such to be recessed with respect to the advancing path section or area AP of a tired wheel TW, such that the latter does not impact against or come into contact with the protection screen components 5, 6 during the rolling or advancing along the section AP.

With reference to such aspect, the dimensions of the recessed zones RZ1, RZ2 are such to ensure that a wheel TW of a vehicle V does not descend within the same, and for such purpose the same could have width of about 1-5 cm, if desired 2-3 cm.

For such purpose, the recessed zones RZ1, RZ2 are preferably at a lower level than the first inlet section or portion 9 and the second outlet section or portion 10 or at least with respect to the respective edge 12a, 12e of connection with the intermediate section 11.

If desired, at least two recessed zones RZ1, RZ2 are provided: a first recessed zone RZ1 at which the light or light band emitted by the lighting means 3 exits from the casing 2 or better yet from the upper wall 2c, such first recessed zone RZ1 preferably being proximal to the first inlet section or portion 9 and distal from the second outlet section 10, and a second recessed zone RZ2 at which the upper wall 2c of the casing 2 is intercepted by the detection beam or band of the sensor means 4, such second recessed zone RZ2 preferably being proximal to the second outlet section 10 and distal from the first inlet section or portion 9.

Each of the recessed zones RZ1, RZ2 can be defined by two or more segments 11a-11b, 11c-11d of the bridge-connection intermediate section 11 that are tilted with respect to each other.

According to the non-limiting embodiment illustrated in the figures, the intermediate section 11 comprises at least four successive segments 11a-11d that are tilted with respect to the adjacent segments and if desired with respect to the horizontal as well as defining five edges 12a-12e, a first edge 12a common to or connecting between a first segment 11a that is tilted with respect to the horizontal and the first inlet section or portion 9, at least one second edge 12b common to or connecting between the first segment 11a and a second segment 11b, at least one third edge 12c common to or connecting between the second segment 11b and a third segment 11c, at least one fourth edge 12d common to or connecting between the third segment 11c and a fourth segment 11d and at least one fifth edge 12e common to or connecting between the fourth segment 11d and the second outlet section 10.

If desired, the first segment 11a is at about 90° with respect to the second segment 11b and the third segment 11c is at about 90° with respect to the fourth segment 11d.

In such case, the second edge 12b can be, during use, at a lower level than the first edge 12a and the third edge 12c, while the fourth edge 12d can be, during use, at a lower level than the third 12c and fifth 12e edge.

In addition, still in such case, the at least one protection screen component 5 for the lighting means 3 is mounted in or extended along the second segment 11b, while the at least one protection screen component 6 for the sensor means 4 is mounted in or extended along the fourth segment 11d.

More particularly, the protection screen component 5 for a lighting means 3 is mounted at a through window 2d delimited by the second segment 11b, while the protection screen component 6 for a sensor means 4 is mounted at a through window 2e delimited by the fourth segment 11d.

If desired, the segments 11a-11d are tilted in a manner such that the axis orthogonal to the second segment 11b, which during use must correspond with the optical axis x-x of the lighting means 3, defines an acute angle, e.g. equal to between about 30° and about 80°, if desired between about 45° and about 70°, with the horizontal greater than the acute angle, e.g. equal to between about 10° and about 50°, if desired between about 20° and about 35°, always defined with the horizontal from the axis horizontal to the fourth segment 11d, which during use must correspond with the detection axis y-y of the sensor means 4.

The unit 1 could also be provided with means for varying the tilt or position of the at least one lighting means 3 and of the at least one sensor means 4.

The lighting means 3 and/or the sensor means 4 can instead be mounted on an internal wall or plate 13a, 13b, e.g. substantially parallel to a tilted section or segment 11a, 11d in which a respective protection screen component 5, 6 is mounted or along which such component is extended.

More particularly, with reference to the non-limiting embodiment illustrated in the figures, within the housing zone HZ or between the half-shells 2a, 2b, a section or bracket 2f is mounted on which one or more internal walls or plates 13a, 13b are mounted, each of which carrying or supporting one, two or more lighting means 3, such as lasers, e.g. spaced from each other, or one, two or more sensor means 4, such as cameras, e.g. spaced from each other.

If desired, two internal walls or plates 13a, 13b are provided, substantially parallel to each other and tilted with respect to the horizontal, one carrying or supporting the lighting means 3 and the other the sensor means 4. Such internal walls or plates 13a, 13b can be extended from one side of the section or bracket 2f to the other.

The internal walls or plates 13a, 13b can be extended in a direction from one side S1 of the unit 1 to the other S2 in a manner such to direct the lighting/optical or detection axis of the means 3, 4 in the same direction, in particular towards the front F of the unit 1 and in a direction opposite the rear R thereof, or vice versa.

In addition, the internal walls or plates 13a, 13b preferably have different tilt with respect to the horizontal. More particularly, according to the non-limiting embodiment illustrated in the figures, the support plate 13a of the lighting means 3 is closer to the front F of the unit 1 than the support plate 13b of the sensor means 4. In addition, the support plate 13a of the lighting means 3 defines an acute angle with the horizontal smaller than the acute angle always defined with the horizontal by the support plate 13b of the sensor means 4.

By front F of the unit 1, it is intended the part of the latter starting from which a wheel TW of a vehicle V enters into the advancing path AP, while with the term rear R of the unit 1 it is intended the part of the latter starting from which a wheel TW of a vehicle exits from the advancing path AP.

Preferably, the front F of the unit 1 is connected, e.g. welded or bolted, with a first board or a first board segment (not illustrated in the figures), while the rear R of the unit 1 is connected, e.g. welded or bolted, with a second board or a second board segment (not illustrated in the figures). The unit 1 or the casing 2 thereof could also be a constituent part of a respective board.

Alternatively, it is possible to arrange or embed the unit 1 or multiple units on the ground S or in a recess made in the ground, e.g. of a warehouse or test garage, such that the surface, upper during use 2c, of the unit 1 emerges with respect to the ground and is engageable by means of wheels TW of a vehicle.

If desired, still with reference to the non-limiting embodiment illustrated in the figures, within the housing zone HZ or between the half-shells 2a, 2b, a group 19 can also be provided for actuating the lighting means 3 and the sensor means 4.

The actuation group 19 for example comprises detectors of the passage of a wheel TW or of a vehicle V, such as blocks or portions 19a that are protruding with respect to the casing 2, e.g. with respect to the surface, upper during use 2c thereof, if desired mounted within through slots 2g formed in the casing 2; the protruding blocks or portions 19a can be elastically loaded or the actuation group 19 can be pivoted to the casing 2 and be elastically loaded. The actuation group 19 then comprises a part 19b for transmitting the detection of the detectors—e.g. the movement imparted to the protruding blocks or portions 19a by a wheel TW rolling on the advancing path AP—to the lighting means 3 and/or to the sensor means 4, so as to control the turning on or actuation thereof.

The transmission part 19b can have mechanical and/or electronic operation.

Naturally, in the housing zone HZ, means are also arranged, such as cables, batteries or emitters/receivers set for an operator or the actuation group 19 to control and drive the lighting means 3 and the sensor means 4.

With regard to the means 7 for delivering a cleaning fluid above the protection screen component 5, 6, this can comprise at least one nozzle 7a or fluid delivery opening, e.g. pressurized fluid, if desired compressed air, $CO_2$ or an inert gas, as well as a source of such fluid, if desired a pressurized air or $CO_2$ bomb in fluid communication with the nozzle or opening.

Advantageously, the at least one nozzle or opening 7a is arranged with trim such to deliver a flow of air or fluid AF parallel to the or along the external surface 5a, 6a of the protection screen component 5, 6.

Preferably, the nozzle or opening 7a is arranged with trim such to delivery an air flow parallel to or along the external surface 5a, 6a and, for example, in the direction from one side S1 to the other S2 of the unit 1.

With reference to the non-limiting embodiment illustrated in the figures, a protection screen component 5, 6 is arranged in a window 2d, 2e with its edge 5c close to one or more shoulders 2d1 of the upper wall 2c.

The or each delivery means instead comprises a plate 7 mounted, if desired with screws or bolts, on the perimeter of a respective window 2d, 2e, such to partly protrude with a respective protruding portion 7b and tighten the protection screen component 5, 6 in the window 2d, 2e.

The protruding portion 7b has a configuration such to delimit, at least at an intermediate portion thereof, the opening or nozzle 7a.

A through hole 2h is also provided in the wall 2c which is in fluid communication with a chamber 7c delimited by the plate 7 with the wall, upper during use 2c, and in fluid communication with the nozzle or opening 7a. Clearly the through hole 2h is in fluid communication with a source of fluid or air, e.g. pressurized.

The unit 1 can then comprise means for controlling the activation means 8, including at least one sensor component 15 set to detect the entrance, the exit and/or the advancing of a tired wheel TW and/or of a vehicle V on the advancing path section or area AP.

The sensor component 15 can be an ultrasound, optical, magnetic, radar or mechanical sensor.

The activation means 8 can instead include at least one circuit 16 for delivering fluid from a source of cleaning fluid to the delivery means 7 or to the plurality of delivery means 7, a component for opening/closing 17 the delivery circuit 16, such as a valve or solenoid valve with two or more positions, set to open or close the fluid communication between the delivery circuit 16 and a fluid source, such as a $CO_2$ or air bomb, if desired pressurized.

The activation means 8 can then comprise a component 18 for controlling the opening/closing component 17, such as a cable or emitter 18.

In such case, the opening/closing component can comprise a solenoid valve 17 movable into respective operating positions as a function of the signal transmitted by means of a cable or emitter 18, depending on the detections made by the sensor component 15. The solenoid valve 17 can be elastically loaded by means of an elastic loading means 17a.

The sensor component 15 can be part of the actuation group 19 or be a component separate therefrom.

With reference to the embodiment illustrated in the figures, a single delivery circuit 16 is provided in fluid communication, by means of respective branches or arms 16a, 16b, with all the delivery means 7, e.g. each for a respective protection screen component 5, 6, if desired six: four branches or arms 16a for four delivery means 7 set to operate on protection screen components 5, each for a respective lighting means 3, and two branches or arms 16b for two delivery means 7 set to operate on protection screen components 6, each for a respective sensor means 4.

Alternatively, a respective circuit could be provided for each delivery means or for two or more delivery means.

A unit according to the present invention can then also comprise an electronic control unit set to drive the lighting means 3 and the sensor means 4 as well as receive the data or information acquired by the sensor means 4. The control unit could then also be provided for detecting the data emitted by possible sensor components.

The control unit could be controlled or activated by means of any one suitable system, e.g. by means of cables, wireless system, Bluetooth, infrared, etcetera.

In addition, the control unit could be mounted within the casing 2 and be in communication with a processor and/or display screen, by means of cables, wireless system, Bluetooth, infrared, etcetera, in order to transmit the data of the detected geometric characteristics as well as to receive suitable command instructions.

Alternatively, the control unit could be mounted outside the casing 2 and in a respective processor and be in communication, by means of cables, wireless system, Bluetooth, infrared, etcetera, with emitters/receivers provided in the casing 2, so as to allow controlling the components of the unit 1, in particular the lighting means 3 and the sensor means 4 and obtain suitable data from the latter.

Figure 6:
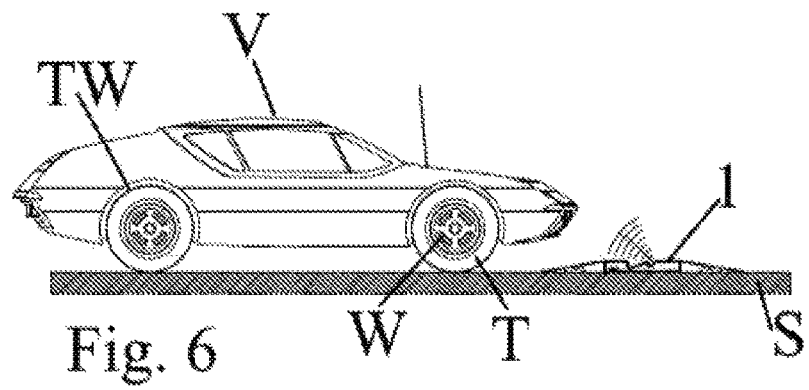
FIGS. 6 to 8 illustrate operating steps for a unit according to the present invention.

In substance, once one or more units 1 according to the present invention are arranged in the ground of a warehouse or garage or on respective boards or board segments, the advancement of a vehicle V with tired wheels TW is controlled over advancing paths AP and then, following activation by an operator or detection by means of a sensor component 15 (see FIG. 6), the lighting means 3 and the sensor means 4 are activated so as to detect geometric characteristics, such as wear or depth of the tread of the tires T of the wheels TW.

Simultaneously or shortly before or shortly after, the delivery means 7 are activated which feed a cleaning fluid above the or above a respective protection screen component.

More particularly, the fluid or gas is blown, flush to the protection screen or glass component 5, 6, creating a kind of pneumatic cushion which does not allow possible dirt—such as dust, water, oil or other items which could for example fall from the vehicle V—to be deposited on the protection screen component 5, 6 or in any case moving away dirt that has been deposited therein.

Figure 7:
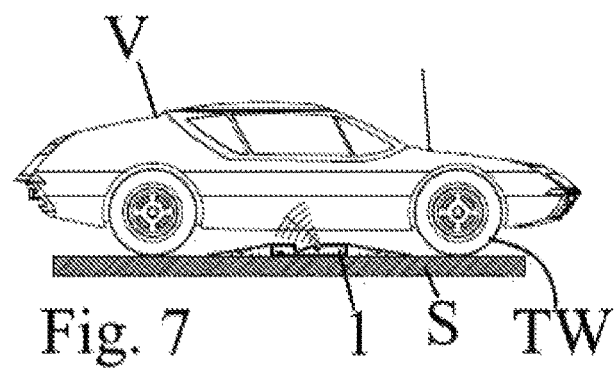
Figure 8:
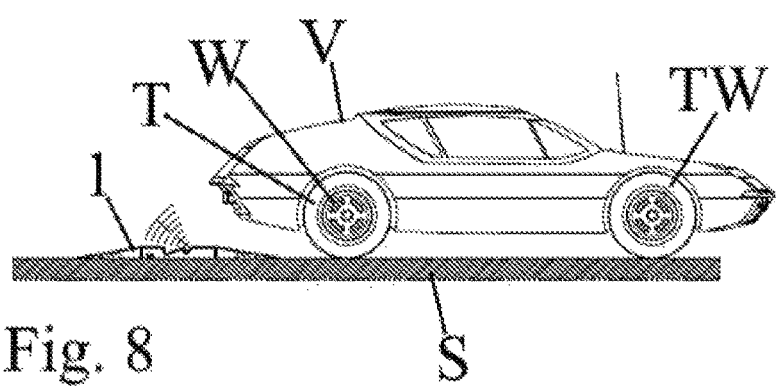

Preferably, the fluid or gas flow, e.g. pressurized, is maintained until the operator or the sensor component has perceived that the wheel or the wheels TW (see FIG. 7) or preferably the entire vehicle (see FIG. 8) has transited above the unit 1 or above the zone of detection by the sensor means 4.

With regard to such aspect, not only can the tires of the wheels allow water to fall, but also the lower portion of the bodywork of the vehicle V can allow water to fall.

In addition, based on the fact that the protection screen component 5, 6 is mounted at a wall, upper during use 2c, of the casing 2, several clear advantages are obtained with respect to the solutions according to the state of the art, which for example is represented by U.S. Pat. No. 9,046, 446B1.

Indeed, for such purpose, with respect to the device taught in such United States patent, with a unit 1 according to the present invention the dirt is thrust outside the unit, for example to the side, so that in order to definitively eliminate the dirt it will suffice to clean the zone around the unit, without having to each time open the latter.

In addition, the specific structure of the casing of a unit according to the present invention ensures an optimal position for the lighting means 3 and the sensor means 4, without running the risk of mounting these components in a position such to not be able to detect the geometric characteristics of a tired wheel.

This could instead occur in the device of U.S. Pat. No. 9,046,446B1, since the casing of the same has laser and cameras mounted within the casing, with an opening in the latter that must be correctly aligned with the work axis of the image acquisition components, otherwise it would not be possible to conduct the necessary detections.

A unit according to the present invention is thus more efficient, easier to clean, assembly and maintain than the solutions according to the state of the prior art.

Modifications and variations of the invention are possible within the protective scope defined by the claims.

The invention claimed is:

1. A unit for detecting geometric characteristics of a component of a tired wheel of a vehicle, comprising:
    a casing or housing box internally defining at least one housing zone and externally defining an advancing path area of a tired wheel,
    at least one laser set to illuminate a portion of a component of a tired wheel,
    at least one camera set to detect geometric characteristics of a component of a tired wheel of a vehicle illuminated by said at least one laser,
    at least one protection screen or glass component for said at least one laser and for said at least one camera,
    at least one nozzle for delivering a cleaning fluid above said at least one protection screen component,
    an activation circuit for controlling said at least one delivery nozzle,
    said at least one laser and said at least one camera being housed in said at least one housing zone,
    wherein said at least one protection screen component is mounted at a wall, upper during use, of said casing or housing box on one side defining said housing zone and on the other side an advancing path section area of a tired wheel, such that said at least one protection screen component opens or appears outside said casing, while said at least one nozzle for delivering a cleaning fluid is set to act on the outside of said casing at the external surface of said at least one protection screen component.

2. The unit according to claim 1, wherein said wall, upper during use, of said casing delimits at least one recessed zone, and wherein said at least one protection screen component opens or appears at a respective recessed zone.

3. The unit according to claim 2, wherein said at least one recessed zone is in a recess with respect to said advancing path area of a tired wheel, such that a tired wheel does not impact or does not come into contact with said at least one protection screen component during the rolling or advancing in said path section.

4. The unit according to claim 2, wherein said wall, upper during use, has a first inlet portion in said advancing path area, a second outlet portion from said advancing path area and an intermediate portion for bridge connection between said first inlet portion and said second outlet portion, said intermediate portion including two or more successive segments that are tilted with respect to the adjacent sections, so as to define at least one recessed zone, and wherein said at least one protection screen component is extended in or along one of said sections.

5. The unit according to claim 4, comprising at least two recessed zones, a first recessed zone at which the light or light band emitted by said at least one laser exits from said upper wall, said at least one laser being proximal to said first inlet portion and distal from said second outlet portion and a second recessed zone at which said upper wall of said casing is intercepted by the detection beam or band of said at least one camera proximal to said second outlet portion and distal from said first inlet portion.

6. The unit according to claim 5, wherein each of said recessed zones is defined by two segments that are tilted with respect to each other of said intermediate portion.

7. The unit according to claim 1, wherein said at least one protection screen component is mounted at a through window delimited by the wall, upper during use.

8. The unit according to claim 1, wherein said at least one nozzle for delivering a cleaning fluid above said at least one protection screen component comprises at least one nozzle or delivery opening for a fluid as well as a fluid source in fluid communication with said at least one nozzle or opening.

9. The unit according to claim 8, wherein said at least one nozzle or opening is arranged with trim such to deliver a flow of air or fluid parallel to or along an external surface of said at least one protection screen component.

10. The unit according to claim 1, comprising means for controlling said activation means including at least one sensor component set to detect the entrance, the exit and/or the advancement of a tired wheel and/or of a vehicle on said advancing path area, while the activation means include at least one circuit for the delivery of a fluid from a source of cleaning fluid to said at least one nozzle, a component for opening/closing said at least one delivery circuit set to open or close the fluid communication between said at least one delivery circuit and a fluid source.

11. The unit according to claim 1, wherein said at least one laser and/or said at least one camera are mounted next to or in contact with the internal surface of said at least one protection screen component.

12. The unit according to claim 11, wherein said wall, upper during use, of said casing delimits at least one recessed zone, and wherein said at least one protection screen component opens or appears at a respective recessed zone, wherein said at least one recessed zone is in a recess with respect to said advancing path area of a tired wheel, such that a tired wheel does not impact or does not come into contact with said at least one protection screen component during the rolling or advancing in said path section, and wherein said at least one laser and/or said at least one camera are mounted on an internal wall substantially parallel to a tilted section or segment in which a respective protection screen component is mounted or along which it is extended.

13. The unit according to claim 1, further comprising four lasers and two cameras.

* * * * *